Sept. 23, 1924.

J. F. WEIGAND

HOSE COUPLING

Filed Dec. 24, 1920

1,509,802

Inventor
Joseph F. Weigand,

By Bacon & Thomas

Attorneys

Patented Sept. 23, 1924.

1,509,802

UNITED STATES PATENT OFFICE.

JOSEPH F. WEIGAND, OF EVANSVILLE, INDIANA.

HOSE COUPLING.

Application filed December 24, 1920. Serial No. 432,911.

*To all whom it may concern:*

Be it known that I, JOSEPH F. WEIGAND, citizen of the United States of America, residing at Evansville, in the county of Vanderburgh and State of Indiana, have invented certain new and useful Improvements in Hose Couplings, of which the following is a specification.

The invention relates to improvements in a detachable hose connection.

It is an object of the invention to provide a hose connection which may be readily applied to a hose, and firmly united thereto, having means at one end for securing the connection to a hydrant, nozzle, or hose, as the occasion may require.

With the foregoing conception in mind, the invention contemplates a hose connection having separable hinge parts adapted to be pivotally united and surround a hose receiving an interior nipple or thimble in combination with an adjustable tightening nut cooperating with said separable parts to firmly clamp the same on the hose. The interior mandrel or nipple may, if desired, support for a rotary movement a coupling member by which a hose may be secured to a hydrant or the like, although it will be understood that instead of being secured to a nipple, the mandrel may be united to another hose or any other connection.

In the accompanying drawings I have shown one specific embodiment of the invention, but it will be understood that the structure may be materially changed without departing from the spirit thereof.

In the drawings, Figure 1 represents a longitudinal sectional view of the coupling.

Figure 1:
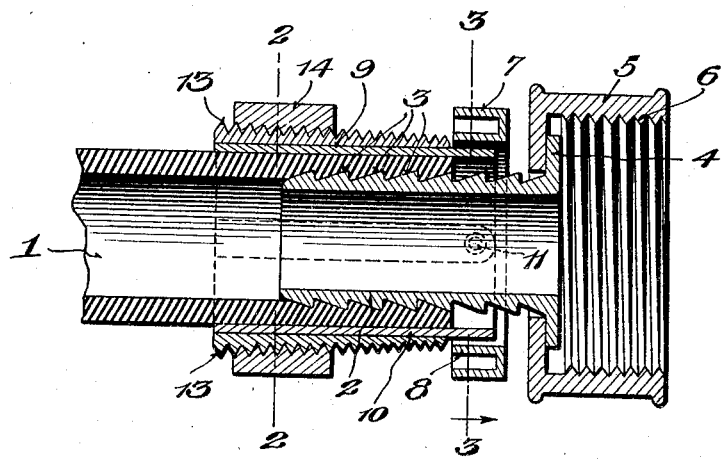

Referring now more particularly to the drawings, wherein like reference characters indicate corresponding parts, the numeral 1 designates a hose, which may be of the rubber and fabric type, and receives at its open end a nipple or mandrel 2 having corrugations or threads 3 thereon adapted to present a rough surface to engage the inner wall of the hose. The nipple is formed at its outer end in this disclosure with an outstanding collar 4, for the purpose of receiving and holding for a rotary movement, the coupling member 5, having the interior threads 6 therein, which may be united to a hydrant plug or the like.

When the coupling is to be applied the nipple 2 is inserted within the interior of the end of the hose 1 after the coupling shell 6 has been slipped thereon. This shell consists of an octagon shaped base 7 having an interior collar 8 to which is pivotally attached the clamping segments 9 and 10 by the pivot pins 11 passing through the sides of said segments and the base. This permits the segments to have an expanding movement to receive the hose, and it should be here observed that these segments are provided with threaded plates 13 extending the full length thereof, the diameter of the threads increasing toward the outer end of the segments for the purpose of applying pressure thereto when the adjustable clamping nut 14 is properly adjusted thereon.

Figure 2:
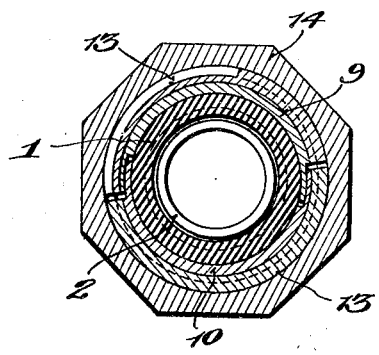
Fig. 2 is a section on line 2—2 of Fig. 1.
Figure 3:
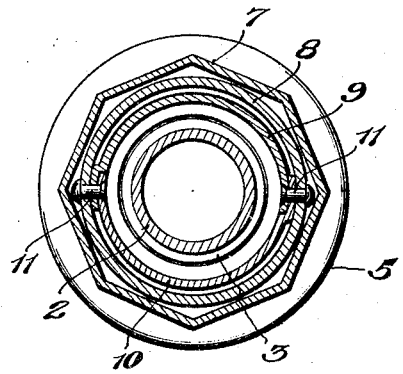
Fig. 3 is a section on line 3—3 of Fig. 1.

Seated upon the segments 9 and 10 is the threaded nut 14 having an octagon shaped surface to permit a wrench to be engaged therewith, and when the hose is to be clamped to the shell, this nut is rotated outwardly engaging the threads, which progressively increase in diameter toward the outer end of the segments 9 and 10 and serve to force the segments from each other to firmly compress the hose 1 between said segments and the nipple 2 when the nut is moved to the outer position, as shown in Figure 2. When the segments have been compressed upon the hose, then the hose is firmly attached to the shell, after which the shell may be united to a hydrant or the like by the threaded rotary coupling member 5.

Should it be desired to move the coupling from the hose, then the coupling nut 14 is rotated inwardly until it engages the base 8, which allows sufficient suspension of the segments 9 and 10, which enables the hose to be removed therefrom. This suspension and contraction of the segments is due to the tapered formation of the threads which are disposed at progressively increased diameters, increasing of course toward the outer end of the segments.

While I have disclosed the coupling as having the rotatable coupling member 5 at one end for the purpose of uniting the same with a hydrant or the like, this coupling can, of course, be directly connected with a hose, permanent connection, pipe or the like, for uniting the end of the tube 1 thereto, and we wish it to be understood that the invention contemplates the provision of any suitable type of coupling which may be mounted upon the nipple 3, or the nipple may be itself connected with another coupling member.

Having thus described the invention, what I claim is:—

A coupling device of the character described, comprising a retaining element having a base and an integrally formed interior collar concentrically arranged with respect thereto semi-circular sections pivotally secured at their ends to said interior collar retaining member and adapted to have independent relative movements, said sections being adapted to surround a conduit, and a nipple positioned within the conduit, an adjustable nut mounted on said sections for moving the independently movable sections toward each other on an adjustment of the nut in one direction to clamp the conduit upon the nipple, and a coupling member carried by the nipple.

In testimony whereof I affix my signature.

JOSEPH F. WEIGAND.